United States Patent [19]

Tallant, II

[11] Patent Number: 4,633,321

[45] Date of Patent: Dec. 30, 1986

[54] AUTOMATIC KINESCOPE BIAS CONTROL SYSTEM

[75] Inventor: James C. Tallant, II, Noblesville, Ind.

[73] Assignee: RCA Corporation, Princeton, N.J.

[21] Appl. No.: 726,331

[22] Filed: Apr. 23, 1985

[51] Int. Cl.[4] .......................... H04N 5/68; H04N 9/16
[52] U.S. Cl. ...................................... 358/243; 358/74
[58] Field of Search ................... 358/242, 243, 29, 33, 358/34, 74, 171

[56] References Cited

U.S. PATENT DOCUMENTS

| 4,263,622 | 4/1981 | Hinn | 358/242 |
| 4,484,228 | 11/1984 | Parker | 358/243 |
| 4,502,079 | 2/1985 | Filliman | 358/243 |

Primary Examiner—Tommy P. Chin
Attorney, Agent, or Firm—P. J. Rasmussen; P. M. Emanuel; R. H. Kurdyla

[57] ABSTRACT

A television receiver with a planar faceplate kinescope includes an automatic kinescope bias (AKB) control system wherein the kinescope electron gun is energized to induce a cathode output current, representative of the kinescope black image current level, in response to an auxiliary drive signal applied to the electron gun during AKB operating intervals. The auxiliary signal exhibits an amplitude for inducing the cathode current only during horizontal trace intervals encompassed by the interval when the auxiliary signal occurrs.

7 Claims, 4 Drawing Figures

AUTOMATIC KINESCOPE BIAS CONTROL SYSTEM

This invention concerns apparatus for automatically controlling the bias of an image display device such as a kinescope in a television receiver. In particular, this invention concerns such apparatus in a video system employing a display device having an aspherical, substantially planar faceplate.

Video signal processing and display systems such as television receivers sometimes employ an automatic kinescope bias (AKB) control system for automatically maintaining proper black image current levels for each electron gun of an associated image displaying kinescope. As a result of this operation, displayed picture colors and picture gray scale information are prevented from being adversely affected by variations of kinescope bias from a desired level due to aging and temperature effects, among other factors. Illustrative types of AKB systems are described, for example, in U.S. Pat. No. 4,263,622—Hinn and U.S. Pat. No. 4,484,228—Parker.

An AKB system typically operates during image blanking intervals when the kinescope conducts a small black image representative current. This current is sensed by the AKB system to generate a control signal representing the difference between the magnitudes of the sensed black image current and a desired black current, and the control signal is applied to video signal processing circuits for reducing the difference.

Most color kinescopes being manufactured have spherically contoured faceplates. Recently, new, flatter faceplate kinescopes having an aspherical faceplate contour have been introduced. For such kinescopes the curvature of the faceplate at the center of the faceplate differs from the curvature nearer the edges to provide faceplate edges that are substantially in one plane. That is, the kinescope faceplate has a relatively shallow curvature near the center of the faceplate, which increases near the edges along paths parallel to both the major and minor axes of the faceplate. The overall result is a faceplate of relatively flat appearance and with planar edges, that is, with points along the top, bottom, right and left edges located substantially in a common plane. A kinescope of this type will hereinafter be referred to as a "planar" kinescope, and is described in the following three copending U.S. patent applications: Ser. No. 469,772—F. R. Ragland, Jr. and Ser. No. 469,774—F. R. Ragland, Jr., both filed on Feb. 25, 1983, and Ser. No. 529,644—R. J. D'Amato et al. filed on Sept. 6, 1983.

In a color television receiver using a planar kinescope, the raster geometry is such that the trace and retrace scanning patterns of each horizontal image line exhibits an arcing configuration, particularly near the top and bottom of the raster scanning pattern of the display screen. Thus the kinescope electron beam scans the display screen along an arcing trajectory which must be corrected to produce a linear horizontal scanning pattern at least during the image trace intervals in order to produce a proper picture display. Correcting the arcing scanning pattern during retrace intervals is not considered necessary for a proper display insofar as the kinescope display is normally blanked at such times to prevent objectionable retrace artifacts from being seen by a viewer.

It has been observed that, in correcting the trace interval scanning pattern, some deflection systems produce an "anti-corrected" retrace interval scanning pattern, i.e., a retrace scanning pattern with an exaggerated arcing trajectory. The latter effect is not normally a problem because as noted above the kinescope display is normally blanked during retrace intervals.

It is herein recognized, however, that the anti-corrected retrace pattern is unacceptable in a receiver employing an AKB system of the type which requires that the kinescope remain unblanked during several horizontal line intervals when the kinescope electron guns are energized to conduct a white-going current while kinescope bias monitoring circuits are active. These unblanked intervals normally occur shortly after the end of the vertical retrace interval during the picture "overscan" portion of the display at the very top of the display screen, which is not seen by the viewer. However, the aforementioned anti-corrected horizontal retrace pattern exhibits a more pronounced downward arcing trajectory at the top of the display screen which extends into the portion of the display seen by the viewer, causing an objectionable visible artifact to be displayed during the unblanked AKB operating interval in the form of several horizontal retrace lines in whole or in part.

The objectionable visible horizontal retrace portions described above are eliminated in accordance with the principles of the present invention by selectively energizing the kinescope electron guns to conduct a white current only during trace intervals within the AKB bias monitoring interval. In a disclosed embodiment of the invention, the kinescope electron gun is caused to conduct a white-going current during plural horizontal line intervals in response to a locally generated drive signal applied to the kinescope electron gun during a given portion of the AKB bias monitoring interval. The drive signal is blanked during horizontal retrace intervals to eliminate the white current at such times, thereby eliminating visible horizontal line retrace artifacts which would otherwise appear due to the uncorrected retrace pattern of planar kinescope.

Figure 1:
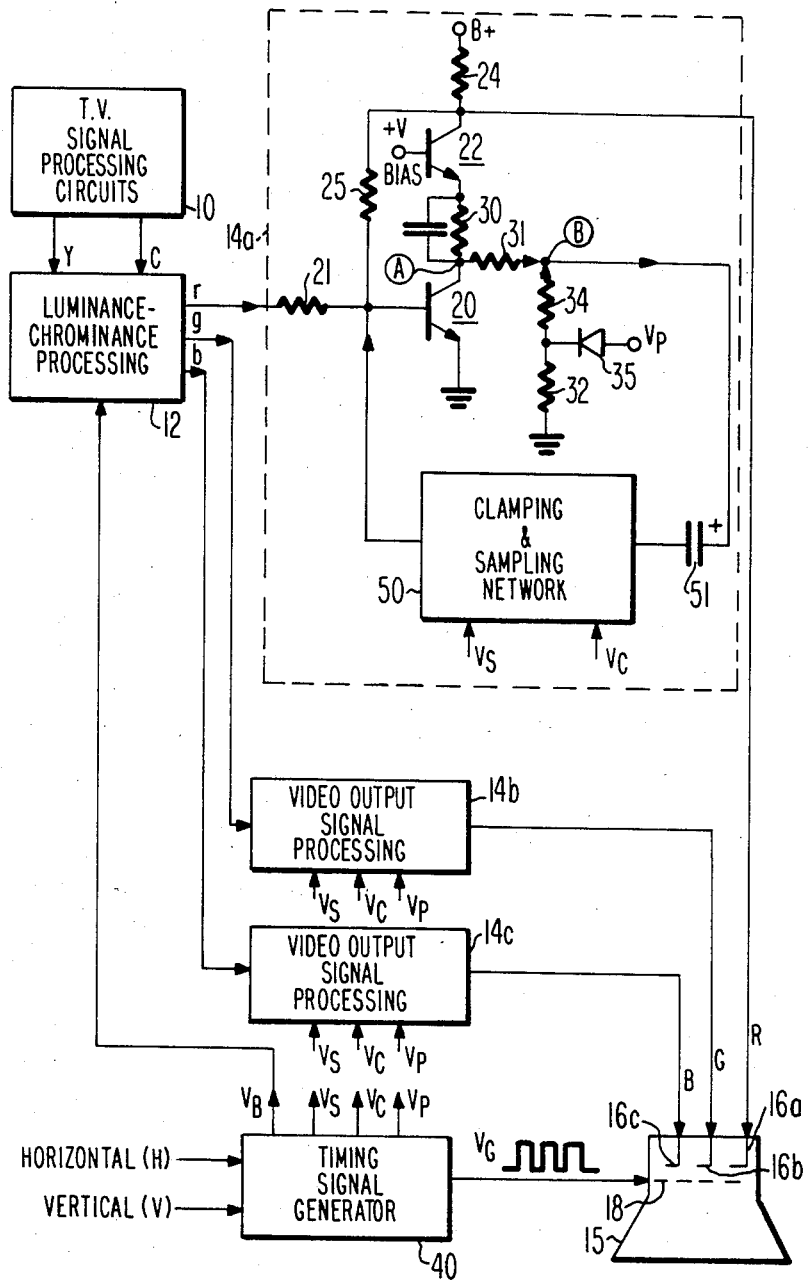
FIG. 1 shows a portion of a television receiver including an AKB system in accordance with the present invention.

In FIG. 1, television signal processing circuits 10 provide separated luminance (Y) and chrominance (C) components of a composite color television signal to a luminance-chrominance signal processing network 12. Processor 12 includes luminance and chrominance gain control circuits, DC level setting circuits (e.g., including keyed black level clamping circuits), color demodulators for developing r-y, g-y and b-y color difference signals, and matrix amplifiers for combining the latter signals with processed luminance signals to provide low level color image representative signals r, g and b. These signals are amplified and otherwise processed by circuits within video output signal processing networks 14a, 14b and 14c, respectively, which supply high level amplified color signals R, G and B to respective cathode intensity control electrodes 16a, 16b and 16c of a color kinescope 15. Networks 14a, 14b and 14c also perform functions related to the AKB bias monitoring and control operation, as will be discussed.

Kinescope 15 is of the self-converging, in-line gun type with a commonly energized grid 18 associated with each electron gun comprising cathode electrodes 16a, 16b and 16c. Additionally, kinescope 15 is of the planar type with an aspherical faceplate contour, such as the RCA 110° COTY-SP, square-planar, 27V color kinescope, Model No. A68ACC10X. Since output signal processors 14a, 14b and 14c are similar in this example, the following discussion of the operation of processor 14a also applies to processors 14b and 14c.

Processor 14a includes a kinescope driver stage comprising an input common emitter transistor 20 which receives video signal r from processor 12 via an input resistor 21, and an output high voltage common base transistor 22 which together with transistor 20 forms a cascode video driver amplifier. High level video signal R, suitable for driving kinescope cathode 16a, is developed across a load resistor 24 in the collector output circuit of transistor 22. An operating supply voltage for amplifier 20, 22 is provided by a source of high DC voltage, B+ (e.g., +230 volts). Direct current negative feedback for driver 20, 22 is provided by means of a resistor 25.

A sensing resistor 30 DC coupled in series with and between the collector-emitter paths of transistors 20 and 22 serves to develop a voltage, at a relatively low voltage sensing node A, representing the level of kinescope bias and cathode current conducted during kinescope blanking intervals. Resistor 30 functions in conjunction with the AKB system of the receiver, which will now be discussed.

A timing signal generator 40 containing sequential and combinatorial logic control circuits, including binary counters and gates, responds to periodic horizontal synchronizing rate signals (H) and to periodic vertical synchronizing rate signals (V), both derived from deflection circuits of the receiver (not shown) for generating timing signals VB, VS, VC, VP and VG which control the operation of the AKB system during periodic AKB intervals. In accordance with the principles of the present invention, signal VG exhibits a waveshape for preventing objectionable horizontal line scanning patterns from appearing on the kinescope display screen during AKB operating intervals as will be described subsequently. Each AKB interval begins shortly after the end of the vertical retrace interval within the vertical blanking interval, and encompasses several horizontal line intervals also within the vertical blanking interval. During the vertical blanking interval video signal image information is absent. The timing signals are illustrated by the waveforms in FIG. 2.

Figure 2:
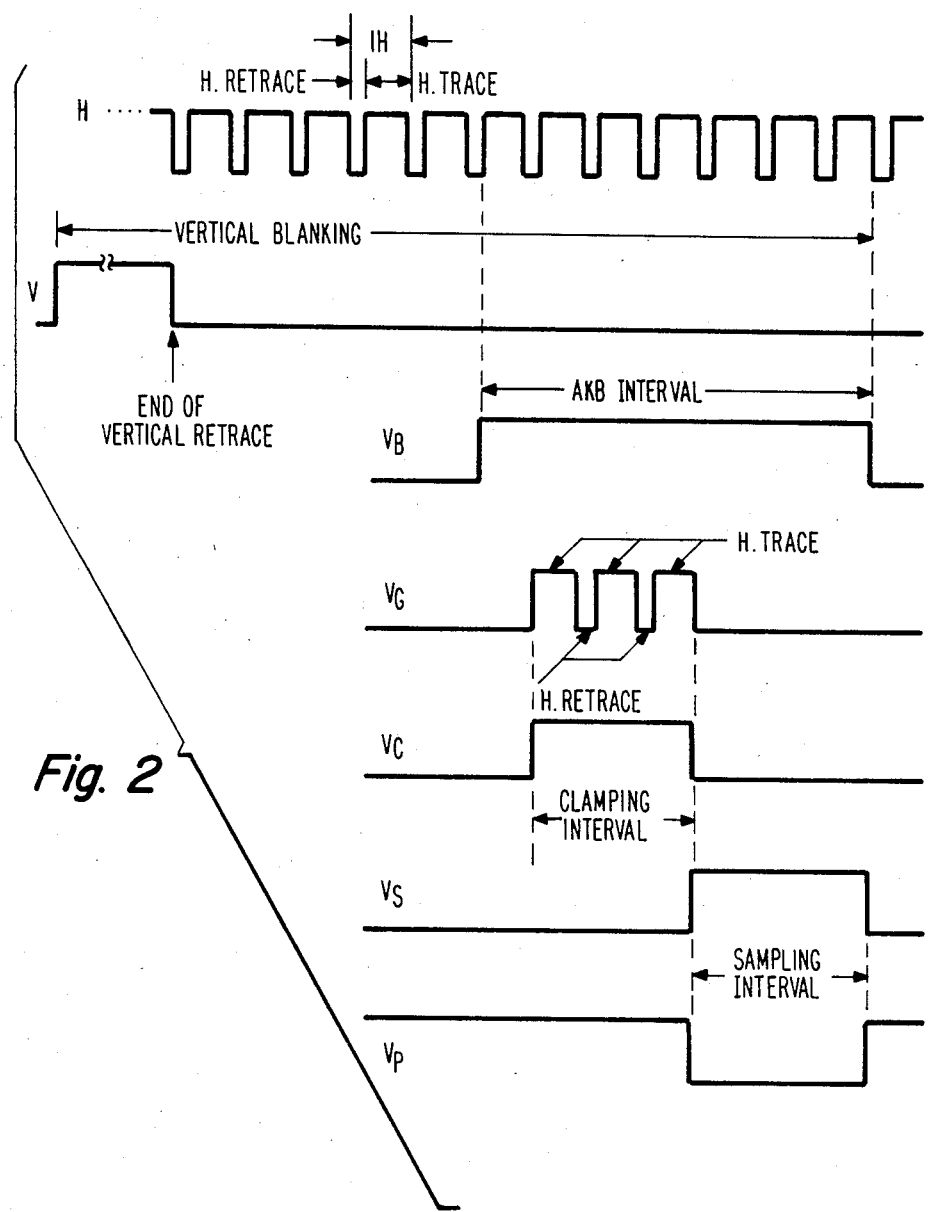
FIG. 2 shows timing waveforms helpful in understanding the operation of the AKB system shown in FIG. 1.

Referring to FIG. 2 for the moment, timing signal VB, a video blanking signal, comprises a positive pulse generated soon after the end of the vertical retrace interval ends, as indicated by reference to signal waveform V. Blanking signal VB exists for the duration of the AKB signal and is applied to a blanking control input terminal of luminance-chrominance processor 12 for causing the r, g and b outputs of processor 12 to exhibit a black image representative DC reference level corresponding to the absence of video signals. This can be accomplished by reducing the signal gain of processor 12 to substantially zero via the gain control circuits of processor 12 in response to signal VB, and by modifying the DC level of the video signal processing path via DC level control circuits of processor 12 to produce a black image representative reference level at the signal outputs of processor 12.

Timing signal VG, a composite signal comprising plural positive pulses occuring during horizontal image trace intervals in accordance with the present invention, is applied to the kinescope grid during the AKB interval. Although not shown, signal VB is slightly delayed (by approximately 200 nanoseconds) relative to signal VC.

Timing signal VC controls the operation of a clamping circuit associated with the signal sampling function of the AKB system. Timing signal VS, a sampling control signal, occurs after signal VC and serves to time the operation of a sample and hold circuit which develops a DC bias control signal for controlling the kinescope cathode bias and black current level. Signal VS encompasses a sampling interval the beginning of which is slightly delayed (by approximately 200 nanoseconds; not shown) relative to the end of the clamping interval encompassed by signal VC, and the end of which substantially coincides with the end of the AKB interval. A negative-going pulse VP, the function of which will be mentioned subsequently, coincides with the sampling interval.

Referring again to FIG. 1, during the AKB interval, signal VG is applied to grid 18 of planar kinescope 15, causing the electron gun comprising cathode 16a and grid 18 to increase conduction in response to the positive trace interval pulse components of signal VG. At other times signal VG provides the normal, less positive bias for grid 18.

In response to the positive pulse components of signal VG, similarly phased white-going current is conducted by cathode 16a. The amplitude of such induced cathode output current is related to the level of cathode black current conduction (typically a few microamperes). The waveshape of grid drive signal VG prevents unwanted visible artifacts from being seen on the kinescope display screen when cathode output current is induced in response to signal VG during the AKB interval. In this regard reference is made to FIGS. 3A and 3B.

Figure 3B:
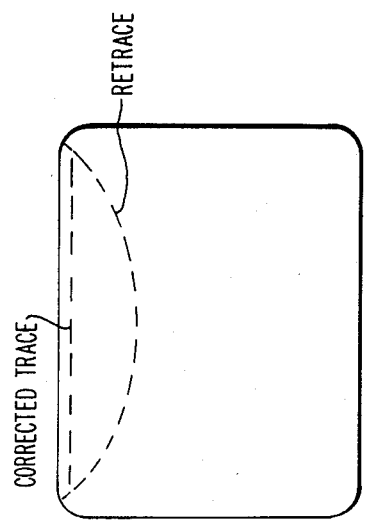
FIGS. 3a and 3b illustrates a horizontal line scanning pattern for a kinescope in the system of FIG. 1.
Figure 3A:
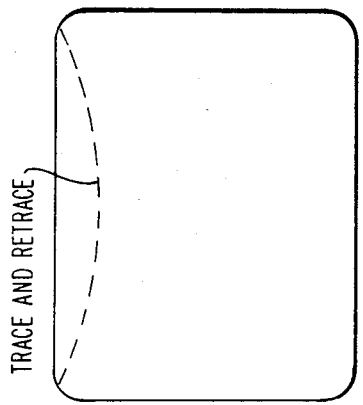

FIG. 3A shows the display screen of a planar kinescope with an uncorrected downward arcing horizontal trace and retrace scanning pattern at the top of the display screen, as indicated by the dotted line. FIG. 3B also illustrates the display screen of a planar kinescope, but with its horizontal scanning pattern corrected in part by deflection circuits of the receiver. In FIG. 3B the horizontal image trace portion has been corrected by the deflection circuits to produce a substantially linear hozizontal image trace pattern, with the retrace portion remaining uncorrected, however. It is typically unnecessary to correct the retrace pattern since the kinescope is normally blanked during retrace to prevent objectionable retrace artifacts from being seen by a viewer.

In achieving a corrected horizontal trace pattern, however, it has been observed that with some deflection systems the downward arcing retrace pattern may be "anti-corrected" such that a more pronounced, deeper arcing retrace pattern results, as seen from FIG. 3B. One type of deflection system capable of producing this result is described in a copending U.S. patent application of Peter E. Haferl, Ser. No. 719,227, titled "North-South Pincushion Corrected Deflection Circuit," filed Apr. 2, 1985. When this occurs it is likely that the retrace pattern of the initial few horizontal lines, which normally are within the "overscan" region not seen by the viewer, will extend into the portion of the display screen seen by the viewer. In a receiver employing an AKB system in conjunction with a planar kinescope, this will result in objectionable visible artifacts to be displayed in the form of several horizontal retrace lines in whole or in part during AKB operating intervals when the kinescope is unblanked to produce an induced cathode output current.

The problem of the objectionable visible artifacts is eliminated in accordance with the present invention by providing grid drive signal VG in the form of a composite signal, with positive white-drive pulse components present only during the horizontal trace intervals encompassed by signal VG, and with signal VG being blanked during horizontal retrace intervals. Thus grid drive signal VG will induce white-going cathode output current only during the (corrected) trace intervals (see FIG. 3B) which are within the kinescope display overscan region and not seen by a viewer.

Continuing with FIG. 1, signal processor 14a also includes a clamping and sampling network responsive to sampling signal VS and clamping signal VC. Network 50 receives, via an AC coupling capacitor 51, an input signal representative of the magnitude of the cathode bias and black image current conducted by kinescope 15, and provides an output bias control voltage to the base of transistor 20. The bias control voltage is representative of a deviation of the kinescope bias and black current level from a desired level, and serves to maintain the desired kinescope bias and black current level by feedback control action.

Network 50 includes an input clamping and sampling operational amplifier, the clamping function of which is operatively associated with input capacitor 51. Signal VC enables the clamping portion of network 50, and signal VS enables the sampling portion of network 50. The bias control voltage is developed by means of a storage capacitor coupled to the output of the sampling amplifier in network 50. Circuit details of network 50 are found in U.S. Pat. No. 4,484,228—Parker, incorporated herein by reference. This patent also provides a detailed description of the operation of the AKB system, which description is summarized below.

During the AKB operating interval when signal VG is applied to the kinescope grid, a white-going cathode output current induced by signal VG and having a magnitude related to the magnitude of black current conducted by the kinescope electron gun appears as a voltage at sensing node A. As explained in the aforementioned Parker patent, during the sampling interval fixed amplitude pulse VP combines at a node B with a signal related to the variable magnitude, black current representative signal developed at node A. A resultant combined signal developed at node B during the sampling interval exhibits a positive amplitude, relative to its condition during the preceding clamping interval, if the kinescope black current level is too high. The resultant signal exhibits a negative amplitude relative to its condition during the preceding clamping interval if the black current level is too low. A correct kinescope black current bias condition causes the amplitude of the resultant signal during the sampling interval to be the same as that during the clamping interval (i.e., no net change in amplitude).

A resultant signal with a net positive or negative amplitude is sensed by network 50, which produces an output bias control voltage with a magnitude to reduce the net positive or negative amplitude of the resultant signal to substantially zero, corresponding to a correct kinescope bias condition. The bias control voltage from network 50, and thereby the bias of driver stage 20, 22 and kinescope cathode 16a, remain unchanged when the resultant signal at node B exhibits no net change in amplitude relative to its condition prior to the sampling interval.

The waveshape of the representative signal developed at node A, and the waveshape of the resultant combined signal developed at node B, are related in form to that of grid drive signal VG. Thus the signal processed by network 50 is not uniform in amplitude, but rather exhibits "perturbations", or amplitude changes, as between the horizontal trace and retrace components thereof. It is therefore important that the timing of signal VG be such that no amplitude perturbation exists at the end of the clamping interval, to prevent an erroneous charge from being developed on input coupling capacitor 51, which also serves as a clamping capacitor. This objective is realized in the disclosed arrangement as can be seen from the FIG. 2 waveforms for signals VG realtive to signal VC. Specifically, it is seen that the negative-going retrace interval amplitude perturbations present in signal VG occurr in the middle of the clamping interval, rather than at the end. At the end of the clamping interval the charge on capacitor 51 is properly related primarily to the positive trace interval amplitude component of grid drive signal VG.

What is claimed is:

1. In a video signal processing and display system including an image display device having an intensity control assembly including an intensity control electrode, and a source of video signals, including image trace and retrace intervals, coupled to said intensity control electrode via a video signal path; apparatus for automatically controlling an operating parameter of said display device comprising:

means for providing an auxiliary signal during a display device operating parameter monitoring interval including said image trace and retrace intervals;

means for coupling said auxiliary signal to said intensity control assembly to induce current conduction by said intensity control assembly, the magnitude of said induced current being related to the condition of said operating parameter of said display device;

means for providing a control signal related to the magnitude of said induced current; and means for coupling said control signal to said video signal path for modifying the bias of said display device in a direction to maintain a desired condition of said display device operating parameter; wherein said auxiliary signal exhibits a first amplitude during said image trace intervals included within each said monitoring interval for developing said induced current, and a second amplitude during said image retrace intervals included within each said monitoring interval for precluding development of said induced current.

2. In a video signal processing and display system including a planar kinescope image display device with a substantially planar peripheral edge, said kinescope having an intensity control assembly including an intensity control electrode; and a source of video signals, including image trace and retrace intervals, coupled to said intensity control electrode via a video signal path; apparatus for automatically controlling an operating parameter of said kinescope comprising:

means for providing an auxiliary signal during a kinescope operating parameter monitoring interval including said image trace and retrace intervals;

means for coupling said auxiliary signal to said intensity control assembly to induce current conduction by said intensity control assembly, the magnitude of said induced current being related to the condition of said operating parameter of said kinescope;

means for providing a control signal related to the magnitude of said induced current; and means for coupling said control signal to said video signal path for modifying the bias of said display device in a direction to maintain a desired condition of said kinescope operating parameter; wherein said auxiliary signal exhibits a first amplitude during said image trace intervals included within each said monitoring interval for developing said induced current, and a second amplitude during said image retrace intervals included within each said monitoring interval for precluding development of said induced current.

3. Apparatus according to claim 2, wherein said auxiliary signal comprises plural pulses of said first amplitude.

4. Apparatus according to claim 2, wherein said video signal blanking interval is a vertical blanking interval;

said image trace interval is a horizontal trace interval within said vertical blanking interval; and said image retrace interval is a horizontal retrace interval within said vertical blanking interval.

5. Apparatus according to claim 2, wherein said kinescope has an electron gun intensity control assembly comprising a cathode electrode corresponding to said intensity control electrode, and a grid electrode to which said auxiliary signal is applied.

6. Apparatus according to claim 2, wherein said auxiliary signal exhibits a non-uniform amplitude characteristic including amplitude perturbations manifested by changes between said first amplitude and said second amplitude; and the timing of said auxiliary signal is such that no amplitude perturbation exists at the end of the interval encompassed by said auxiliary signal.

7. Apparatus according to claim 2, wherein said apparatus automatically controls the bias of said kinescope, and said induced current is related to the magnitude of the black image current bias of said kinescope.

* * * * *